(12) United States Patent
Szela et al.

(10) Patent No.: US 10,173,291 B2
(45) Date of Patent: Jan. 8, 2019

(54) LOW AND EXTRA LOW SULFUR ALLOYS FOR REPAIR

(71) Applicant: UNITED TECHNOLOGIES CORPORATION, Farmington, CT (US)

(72) Inventors: Edward R. Szela, West Springfield, MA (US); Daniel A. Bales, Avon, CT (US); Alan D. Cetel, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 151 days.

(21) Appl. No.: 15/211,238

(22) Filed: Jul. 15, 2016

(65) Prior Publication Data

US 2016/0325387 A1 Nov. 10, 2016

Related U.S. Application Data

(62) Division of application No. 13/291,222, filed on Nov. 8, 2011, now abandoned.
(Continued)

(51) Int. Cl.
*C22F 1/10* (2006.01)
*B23P 6/04* (2006.01)
(Continued)

(52) U.S. Cl.
CPC ............ *B23P 6/045* (2013.01); *B23K 1/0018* (2013.01); *B23K 9/04* (2013.01); *B23K 10/027* (2013.01); *B23K 26/34* (2013.01); *B23K 31/02* (2013.01); *B23K 35/3033* (2013.01); *B23K 35/3046* (2013.01); *B23P 6/007* (2013.01); *C22C 19/03* (2013.01); *C22C 19/057* (2013.01); *C22C 19/07* (2013.01); *C22F 1/10* (2013.01);
(Continued)

(58) Field of Classification Search
CPC ......... B23P 6/045; B23K 1/0018; B23K 9/04; B23K 10/027; B23K 26/34; B23K 31/02; B23K 35/3033; B23K 35/3046; C22F 1/10
See application file for complete search history.

(56) References Cited

U.S. PATENT DOCUMENTS 3,445,624 A 5/1969 Sunnen
4,415,530 A 11/1983 Hunt
(Continued)

FOREIGN PATENT DOCUMENTS

EP 0676489 A1 10/1995
EP 1371439 A1 12/2003
EP 1995346 A2 11/2008

OTHER PUBLICATIONS

U.S. Office action for U.S. Appl. No. 13/291,222 dated Nov. 21, 2013.
(Continued)

*Primary Examiner* — Jessee R Roe
(74) *Attorney, Agent, or Firm* — Bachman & LaPointe, PC

(57) ABSTRACT

A method for repairing, refurbishing, or replacing a turbine engine component or sub-component includes the steps of providing a turbine engine component or sub-component having a site to be repaired, refurbished, or replaced providing a repair or replacement material having a sulfur content, which sulfur content is less than 10 ppm, and
(Continued)

applying the repair or replacement material to the site on the turbine engine component to effect the repair, the refurbishment, or the replacement.

5 Claims, 6 Drawing Sheets

Related U.S. Application Data

(60) Provisional application No. 61/411,072, filed on Nov. 8, 2010.

(51) Int. Cl.
| | |
|---|---|
| *B23P 6/00* | (2006.01) |
| *C22C 19/05* | (2006.01) |
| *C22C 19/07* | (2006.01) |
| *C23C 4/18* | (2006.01) |
| *C23C 28/02* | (2006.01) |
| *C23C 30/00* | (2006.01) |
| *F01D 5/00* | (2006.01) |
| *F01D 5/28* | (2006.01) |
| *C23C 4/01* | (2016.01) |
| *B23K 1/00* | (2006.01) |
| *B23K 9/04* | (2006.01) |
| *B23K 10/02* | (2006.01) |
| *B23K 26/34* | (2014.01) |
| *B23K 31/02* | (2006.01) |
| *B23K 35/30* | (2006.01) |
| *C22C 19/03* | (2006.01) |
| *F01D 5/12* | (2006.01) |
| *F01D 9/02* | (2006.01) |
| *B23K 101/00* | (2006.01) |
| *B23K 103/08* | (2006.01) |

(52) U.S. Cl.
CPC .............. *C23C 4/01* (2016.01); *C23C 4/18* (2013.01); *C23C 28/02* (2013.01); *C23C 30/00* (2013.01); *F01D 5/005* (2013.01); *F01D 5/12* (2013.01); *F01D 5/288* (2013.01); *F01D 9/02* (2013.01); *B23K 2101/001* (2018.08); *B23K 2103/08* (2018.08); *F05D 2220/30* (2013.01); *F05D 2230/31* (2013.01); *F05D 2230/40* (2013.01); *F05D 2230/80* (2013.01); *F05D 2230/90* (2013.01); *F05D 2300/229* (2013.01); *Y10T 29/49318* (2015.01)

(56) References Cited

U.S. PATENT DOCUMENTS

| | | |
|---|---|---|
| 5,346,563 A | 9/1994 | Allen et al. |
| 5,897,801 A | 4/1999 | Smashey et al. |
| 7,165,325 B2 | 1/2007 | Imano et al. |
| 2002/0006524 A1 | 1/2002 | Jaslier et al. |
| 2003/0147769 A1 | 8/2003 | Kiyotoki et al. |
| 2003/0167636 A1 | 9/2003 | Bose et al. |
| 2010/0136368 A1 | 6/2010 | Kiser et al. |

OTHER PUBLICATIONS

U.S. Office action for U.S. Appl. No. 13/291,222 dated Mar. 4, 2014.
U.S. Office action for U.S. Appl. No. 13/291,222 dated Sep. 15, 2014.
U.S. Office action for U.S. Appl. No. 13/291,222 dated Jan. 2, 2015.
U.S. Office action for U.S. Appl. No. 13/291,222 dated Apr. 23, 2015.
U.S. Office action for U.S. Appl. No. 13/291,222 dated Aug. 4, 2015.
U.S. Office action for U.S. Appl. No. 13/291,222 dated Dec. 9, 2015.
U.S. Office action for U.S. Appl. No. 13/291,222 dated Mar. 17, 2016.

LOW AND EXTRA LOW SULFUR ALLOYS FOR REPAIR

CROSS REFERENCE TO RELATED APPLICATION(S)

This application claims priority to U.S. application Ser. No. 13/291,222 filed Nov. 8, 2011, which claims the benefit of U.S. provisional patent application No. 61/411,072, filed Nov. 8, 2010, entitled LOW AND EXTRA LOW SULFUR ALLOYS FOR REPAIR.

BACKGROUND

The present disclosure relates to a method for repairing/refurbishing/creating a turbine engine component or sub-component (e.g., a platform or vane) using a repair material which has sulfur in an amount less than 10 ppm.

Turbine engine components, such as turbine blades, or vanes occasionally have defects which require repair or refurbishment. The defects may arise from the manufacture of the turbine engine component or may arise during the service life of the component. For many years, different repair techniques have been used to repair such components. Occasionally, oxidation occurs in the area of the repair after the repair has been effected. Similarly, repair of turbine components, such as vanes, results in a reduction in oxidation life in crack or surface restoration areas where repair alloys are applied.

Industry practice produces alloy weld wires and powders with sulfur levels specified from a minimum of 40 ppm to a maximum of 100 ppm.

It is desirable to use repair materials which help prevent the onset of oxidation in the repair area and which are capable of increasing oxidation life.

SUMMARY

It has been found that by controlling the amount of sulfur in the repair material, one may obtain marked improvements in oxidation life.

In accordance with the present disclosure, there is described a method for repairing/refurbishing/creating a turbine engine component or sub-component which broadly comprises the steps of providing a turbine engine component/sub-component having a site to be repaired, providing a repair/refurbishment/replacement material having a sulfur content, which sulfur content is less than 10 ppm, and applying said repair/refurbishment/replacement material to the site on the turbine engine component to effect the repair/refurbishment/replacement.

Further, in accordance with the present disclosure, there is provided a nickel based or a cobalt based repair/replacement material having sulfur, which sulfur is present in an amount less than 10 ppm to improve oxidation life of the repaired turbine engine component or sub-component.

Other details of the low and extra low sulfur alloys for repair/refurbishment/replacement are set forth in the following detailed description, wherein like reference numerals depict like elements.

DETAILED DESCRIPTION OF THE PREFERRED EMBODIMENTS

The repair/refurbishment/replacement technique described herein is intended to improve the oxidation life of turbine engine components or sub-components repaired with materials, such as weld wire alloys, weld wire powders, powders used in powder bed machines (e.g., electron beam melting or laser sintering), and brazing materials, by controlling/reducing the level of sulfur in the repair/replacement material. By controlling sulfur levels below 10 ppm, oxidation life can be improved. As sulfur levels are reduced below 7.0 ppm, oxidation life can be improved by up to 3× over conventional sulfur levels. Desirably, the sulfur level in the repair material is less than 1.0 ppm.

Both nickel base and cobalt base alloy turbine components/sub-components could realize life improvement via control of the sulfur content of the material being used to repair/replace the turbine component/sub-component. The sulfur control described herein could yield significant improvements in the oxidation of the life of components/sub-components built by or repaired by the use of additive manufacturing processes such as plasma powder deposition, laser cladding, powder bed equipment (e.g., electron beam melting or laser sintering), or gas metal arc deposition. In particular, reductions in sulfur levels in the repair material could result in improved oxidation behavior of high pressure turbine blade tip repairs (a region of noted oxidation attack during engine service) and areas of surface restoration performed on components such as vanes or blades.

The turbine engine components/sub-components to be repaired/refurbished/created may be formed from alloys such as PWA 1455, PWA 1447, PWA 1422, PWA 1426, PWA 1484, PWA 647, PWA 1480, PWA 1440, PWA 655, Inconel 713, Rene 77, Rene 125, Rene 80, Rene 142, Rene N5, X-40, IN 100, CMSX-4, C1023 and MM002.

Figure 1:
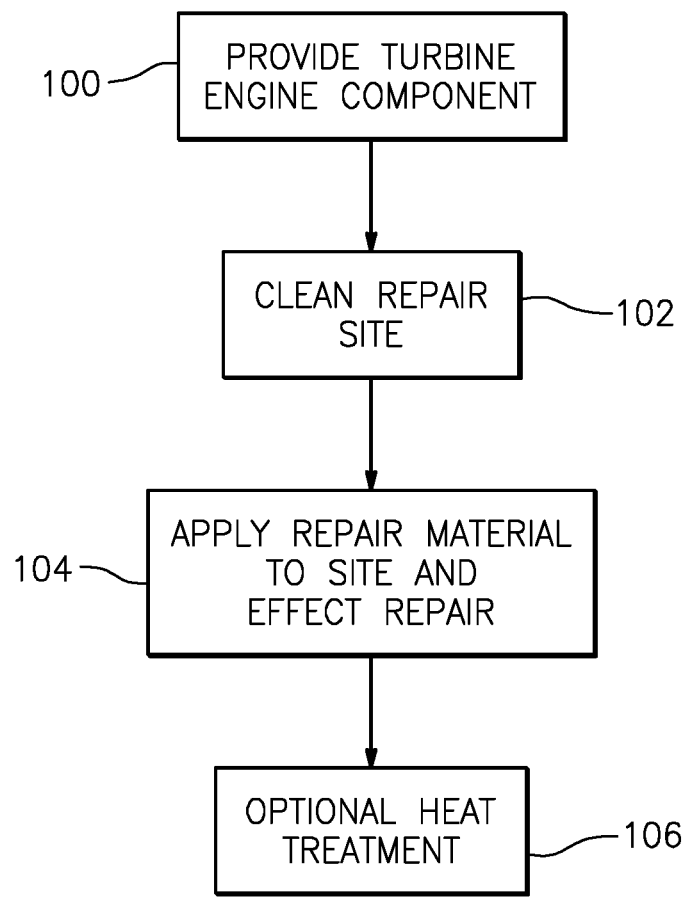
FIG. 1 is a flow chart showing a method for effecting a repair.

In accordance with the method of the present invention, and as shown in FIG. 1, a turbine engine component/sub-component to be repaired/replaced may be provided in step 100. Each site to be repaired/refurbished/replaced may be cleaned in step 102. Any suitable cleaning technique known in the art may be used to remove deleterious material from the site(s) to be repaired and/or clean the site(s).

The repair/replacement material to be applied to the site to effect the repair or the refurbishment may be in the form of a weld wire alloy, a weld wire powder, a powder bed produced component/sub-component, or a repair alloy. The weld wire alloy, the weld wire powder, powder bed produced component/sub-component, or repair alloy may be a nickel based or a cobalt based material. As used herein, the term "nickel based" means a material which has more than 50 wt % nickel and the term "cobalt based" means a material which has more than 50 wt % cobalt. The repair/refurbishment/replacement material may be different from the material forming the turbine engine component. Most notably, the repair/refurbishment/replacement material contains sulfur; however, the sulfur content is less than 10 ppm and more than 0.001 ppm. It has been found to be desirable to maintain the sulfur content in the repair/refurbishment/replacement material in the range of from 0.5 ppm to 1.0 ppm.

As shown in step 104, the repair material used to effect the repair/refurbishment/replacement is applied to the site to be repaired/refurbished/replaced. The repair material may be applied and the repair/refurbishment/replacement may be effected using any suitable technique known in the art. For example, the repair/replacement material may be applied using a welding technique such a gas tungsten arc welding or plasma arc welding, a brazing technique such as diffusing brazing and TURBOFIX® brazing, plasma powder deposition, laser cladding, or gas metal arc deposition. While the method has been described as being a repair method, it should be noted that the method described herein includes additive material restorations and component/sub-component replacements.

Following application of the repair/refurbishment/replacement material, the turbine engine component with the applied repair/refurbishment/replacement material may be subjected to a heat treatment in step 106 if needed. The heat treatment may be any suitable treatment known in the art.

Figure 2:
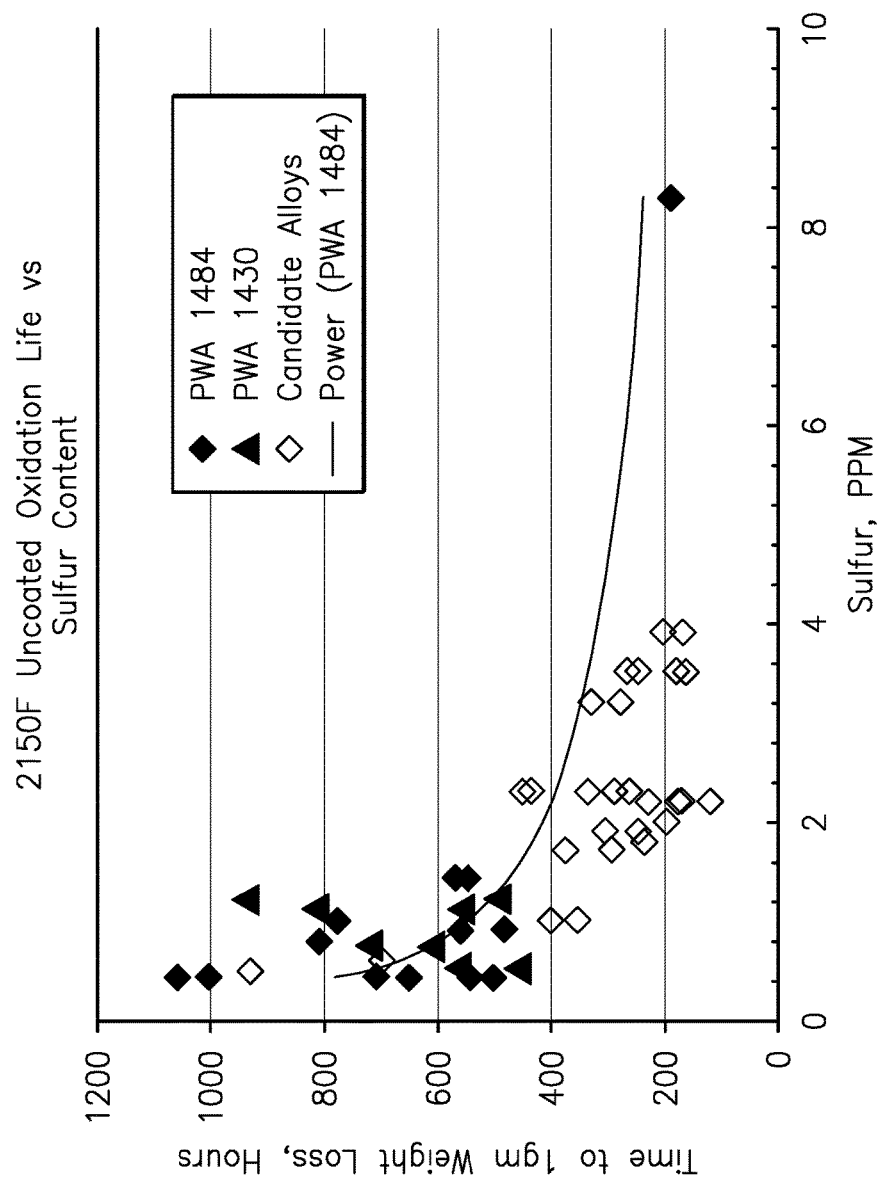
FIGS. 2 and 3 are graphs showing a direct comparison of coated oxidation life of low sulfur PWA 1430 and PWA 1484.
Figure 3:
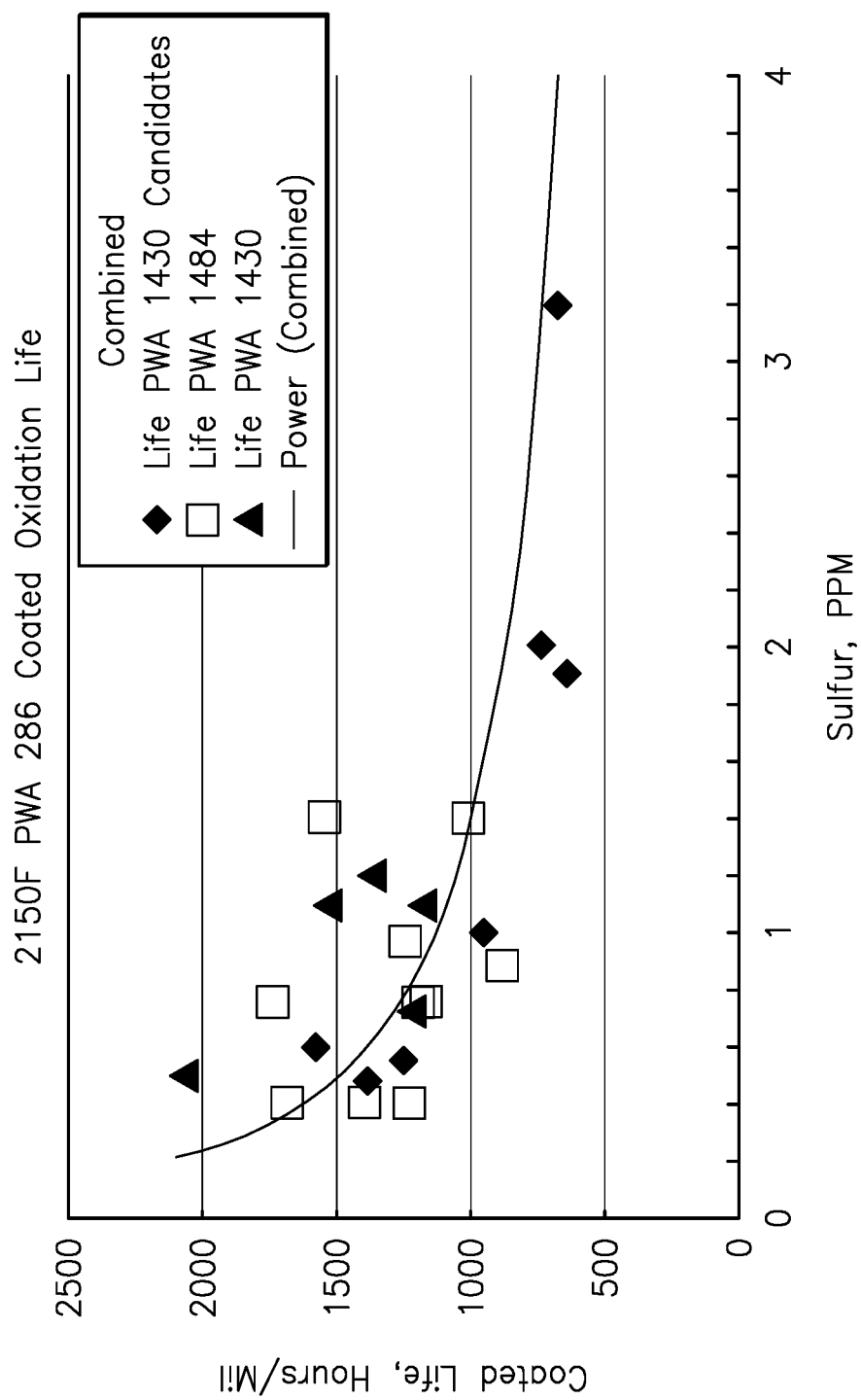
Figure 4:
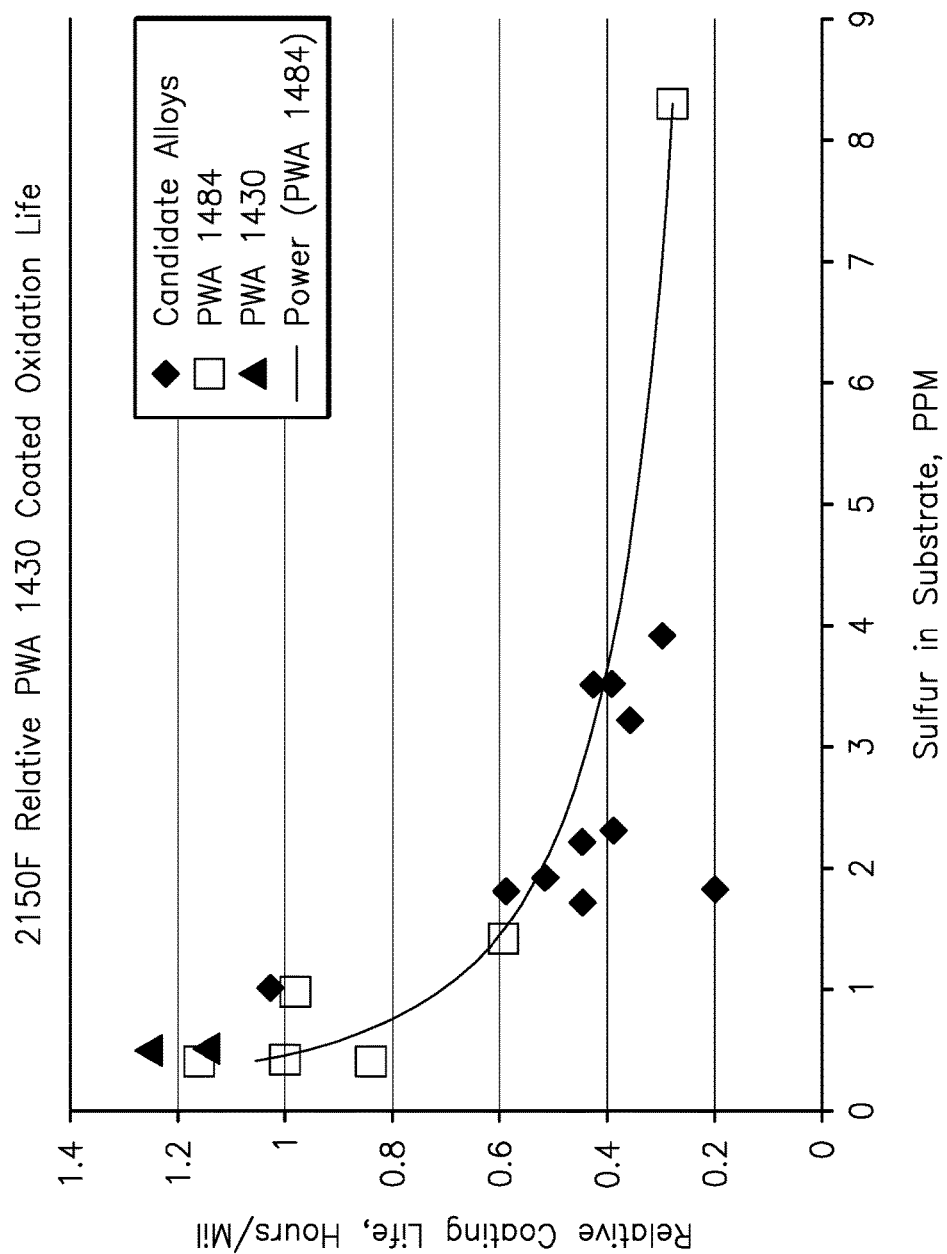
FIGS. 4 and 5 are graphs showing a direct comparison of coated oxidation life of low sulfur PWA 1430 and PWA 1484.
Figure 5:
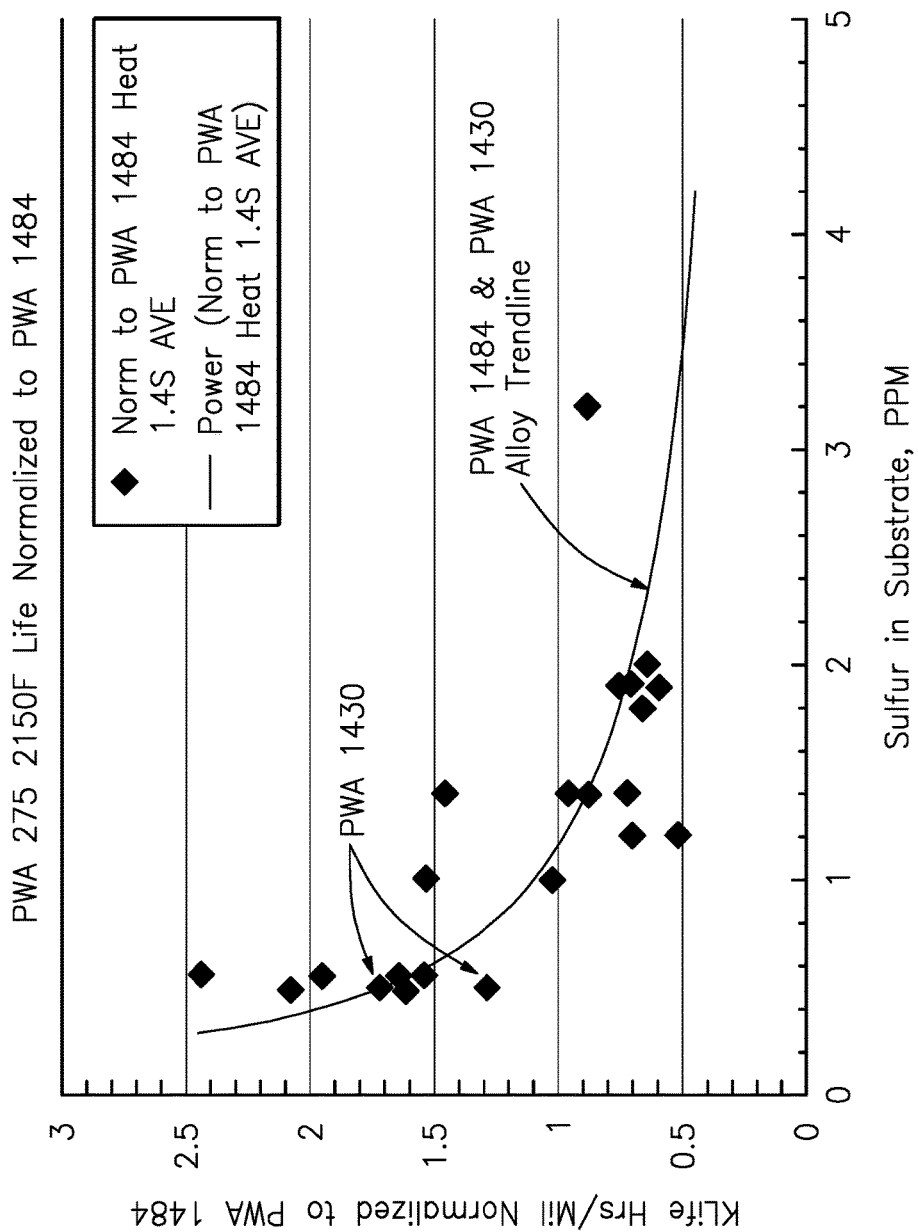

Referring now to FIGS. 2-5, there is shown a series of graphs which illustrate how a reduced sulfur content increases the oxidation life of alloy materials used for repairs in simulated engine exposure testing, i.e. burner rig. FIGS. 2 and 3 illustrate a direct comparison of coated oxidation life of low sulfur PWAS 1430 and PWA 1484. FIGS. 4 and 5 illustrate a direct comparison of coated oxidation life of low sulfur PWA 1430 and PWA 1484.

Figure 6:
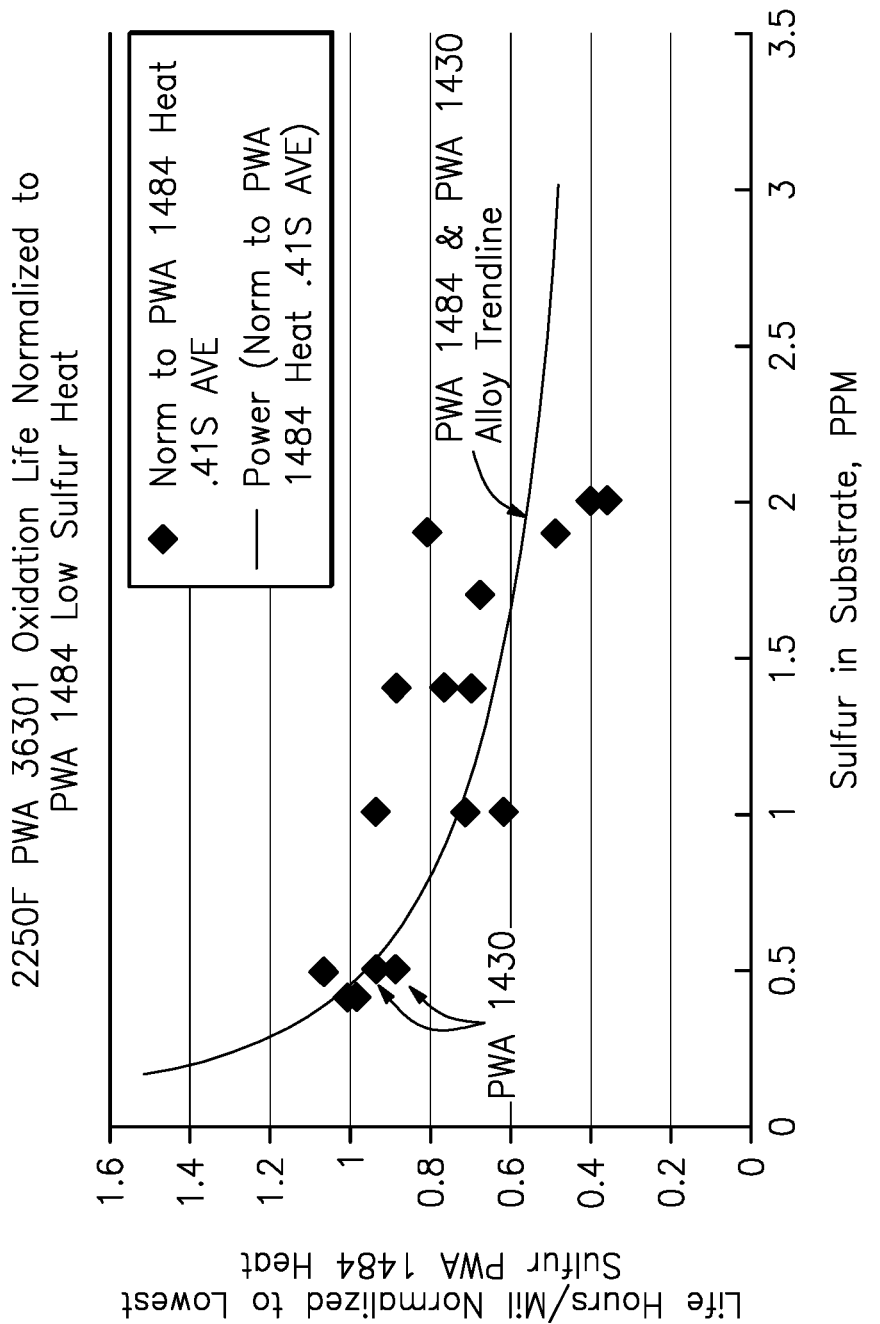
FIG. 6 is a graph illustrating 2150° F. uncoated oxidation life vs. sulfur content.

Referring now to FIG. 6, there is shown a graph illustrating 2150° F. uncoated oxidation life vs. sulfur content. It can be seen that uncoated oxidation life at 2150° F. is strongly influenced by alloy sulfur content.

It is apparent that there has been provided in accordance with the present disclosure low and extra low sulfur alloys for repairing, refurbishing, or replacing turbine engine components/sub-components. While the disclosure has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A method for repairing or refurbishing a turbine engine component comprising the steps of:
   providing a turbine engine component having a site to be repaired;
   providing a repair/refurbishment material having a sulfur content, which sulfur content is between 0.001 ppm and less than 0.3 ppm, and wherein the repair/refurbishment material is different from the material of the site to be repaired; and
   applying the repair/refurbishment material to the site on the turbine engine component to the site on the turbine engine component to effect said repair/refurbishment.

2. The method of claim 1, wherein said step of providing said repair/refurbishment material comprises providing a nickel based repair material having said sulfur content.

3. The method of claim 1, wherein said step of providing said repair/refurbishment material comprises providing a cobalt based repair material having said sulfur content.

4. The method of claim 1, wherein said applying step comprises applying said repair/refurbishment material using a technique selected from the group consisting of a welding technique, a brazing technique, a plasma powder deposition technique, a laser cladding technique, and a gas metal arc deposition technique.

5. The method of claim 1, further comprising subjecting said turbine engine component with said applied repair/refurbishment material to a heat treatment.

* * * * *